United States Patent [19]
Kuster et al.

[11] Patent Number: 5,203,905
[45] Date of Patent: Apr. 20, 1993

[54] HOLDING DEVICE AND METHOD FOR COUNTERBENDING GLAZING PANES

[75] Inventors: Hans-Werner Kuster, Aachen; Werner Diederen; Werner Kahlen, both of Herzogenrath, all of Fed. Rep. of Germany

[73] Assignee: Saint-Gobain Vitrage International, Courbevoie, France

[21] Appl. No.: 785,811

[22] Filed: Oct. 31, 1991

[30] Foreign Application Priority Data

Oct. 31, 1990 [DE] Fed. Rep. of Germany ....... 4034600

[51] Int. Cl.$^5$ ........................................... C03B 23/025
[52] U.S. Cl. ...................................... 65/107; 65/287; 65/289; 65/374.12
[58] Field of Search ................. 65/107, 287, 289, 273, 65/374.12; 294/65; 414/752

[56] References Cited
U.S. PATENT DOCUMENTS 4,300,935 11/1981 Seymour ............................. 65/107

Primary Examiner—Joye L. Woodard
Attorney, Agent, or Firm—Oblon, Spivak, McClelland, Maier & Neustadt

[57] ABSTRACT

A holding device for glazing panes heated in a horizontal position to a deformation temperature comprises a downwardly facing contact surface, to which the glazing pane is held by suction action. The contact surface is formed of a tensioned fabric of highly heat-resistant fibers. As the glazing panes are sucked on, the fabric yields and bulges upwards. The amount of the bulge of the fabric is dependent upon the tension in the fabric. By the bulging of the fabric the glazing pane undergoes a bending opposite to the succeeding bending of the glazing pane under the effect of its self-weight. This counter-bending compensates an undesired transverse bending during the later bending process.

7 Claims, 3 Drawing Sheets

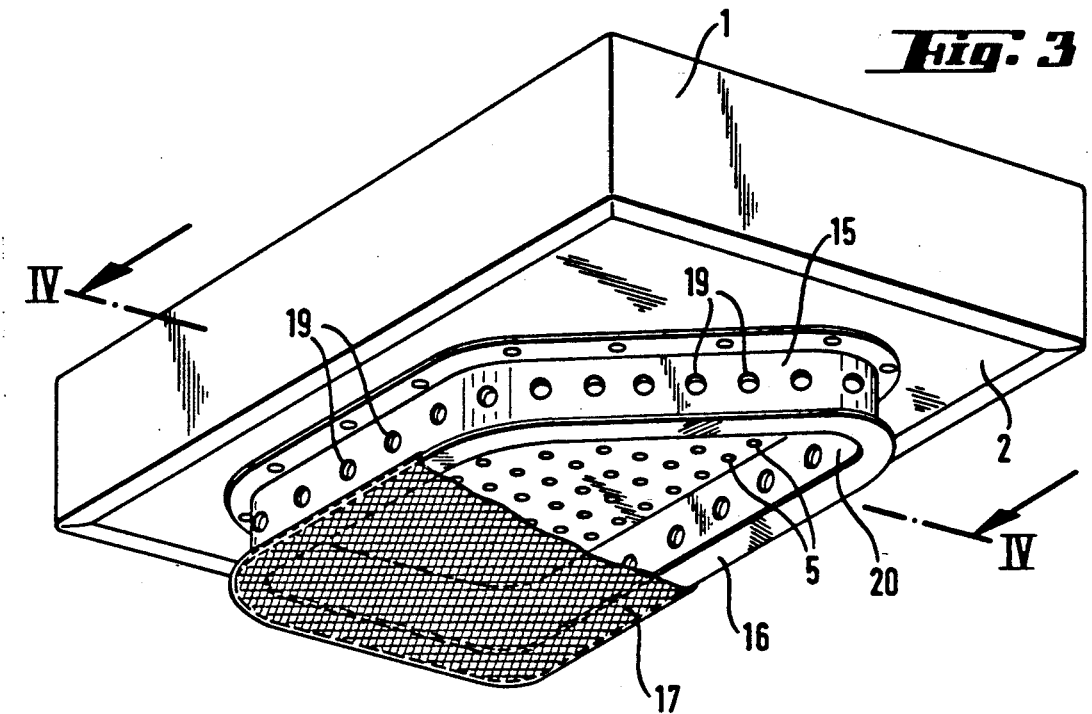
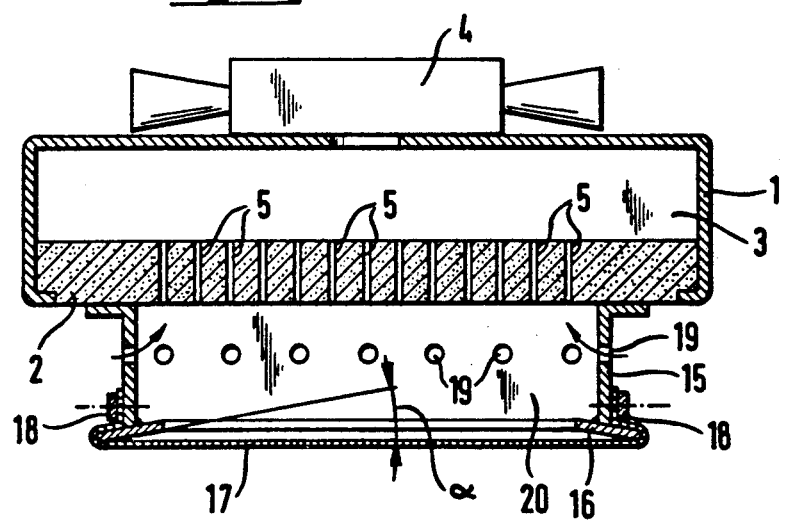

HOLDING DEVICE AND METHOD FOR COUNTERBENDING GLAZING PANES

BACKGROUND OF THE INVENTION

1. Field of the Invention

The present invention relates to a holding device for a glazing pane heated in a horizontal position to deformation temperature, the device having a downwardly facing contact surface, against which the glazing pane is held by differential pressure acting between the lower surface and the upper face of the glazing pane.

2. Description of the Related Art

Holding devices of this type are used in various processes for the production of curved glazing panes, especially the production of curved automobile glazing panes, in order to hold the glazing panes, heated in a once-through furnace to bending temperature, by suction action during the transfer from a horizontal conveyor track to a transporting ring.

A related method for the bending or curving of glazing panes, in which a holding device of this type is used, is described, for instance, in EP-B1 0 003 391 and 0 005 306. In this bending process, the glazing panes which have been heated to bending temperature are lifted off the conveying path by means of a usually plane suction plate and are brought by this suction plate above an annular mold. When the suction plate together with the glazing pane is situated above the annular mold, the suction in the suction plate is cancelled and the glazing pane falls onto the annular mold and seats itself down, under the action of the kinetic energy of descent and its self-weight, onto the annular mold.

In a further related bending process, the holding device is also constructed as a suction mold. In this case, the contact surface of the holding device has a curved shape, so that the glazing pane, as it is sucked onto the contact surface, either undergoes a prior bending or is already bent into its final shape (DE 20 00 271, FR 20 85 464). In this process, the glazing pane, bent on the holding device, is then laid on a support ring having the same peripheral shape, or it is pressed onto the support ring by the holding device before being laid on the support ring and is thereby bent into its final form.

A method of bending glazing panes by the use of the initially named holding device is furthermore known, in which the glazing pane, heated to bending temperature, is lifted by means of a vertically upwardly directed hot gas stream off the conveying path and is held against the holding device (DE-35 23 675). In this case the holding device is not constructed as a suction mold, but consists of a metal mold having a closed surface, against which the glazing pane is pressed by the excess pressure of the upwardly flowing gas stream.

In all the known methods, in which such a holding device is used, the glazing pane is transferred from the holding device onto a support ring, by which the glazing pane is transferred into a cooling station. As a rule, the bent glazing pane is thermally toughened or quenched in the cooling station by the blowing-on of cooling air jets for the production of single-pane safety glass.

In the period between the transfer onto the support ring and the cooling of the glazing pane below its deformation temperature, the glazing pane deforms under the effect of its self-weight, by sagging within the support ring. This deflection or sagging is especially large in the first named bending process, in which the glass pane is bent by the kinetic energy of descent.

To reduce the amount of the sag or deflection within the support ring, which is also termed transverse bending, it is known to provide the contact surface of the holding device with a corresponding concave counter-bend (EP 0 003 391). This counter-bending in the holding device should be so constructed that it compensates the deflection or sag within the support frame.

In practice, the amount of transverse bend under the effect of the self-weight of the glazing pane is not always the same, but changes for instance as a function of the temperature of the glazing pane, of the dwell time of the glazing pane on the support ring and, possibly also, of further process parameters. In the known holding devices, however, the counter-bending for the purpose of compensating the transverse bend cannot be modified, because it is incorporated into the rigid surface of the supporting device, which usually is of a ceramic material. The forming of the counter-bend is, furthermore, an expensive and complex process, so that for this reason alone the provision of a counter-bend in the contact surface of the holding device is frequently dispensed with.

SUMMARY OF THE INVENTION

Accordingly, an object of this invention is to provide a holding device of the initially named type, which produces a counter-bend in the glazing pane which compensates the transverse bend that occurs on the support ring, without expensive machining operations on the holding device being required, and in which, if desired, the amount of the counter-bend can be varied in a simple manner.

According to the invention, this object is achieved in that the contact surface of the holding device is composed of a freely tensioned woven or knitted fabric of highly heat-resistant fibers, at least in the middle region of the area intended for bearing against the glass pane.

Freely tensioned means that, at least in the region in which a counter-bend is to be produced, the woven or knitted fabric is not supported on its rear face. The woven or knitted fabric, instead, must be capable of deflecting elastically to the extent to which a counter-bend is to be produced. The counter-bending adjusts itself automatically under the suction action or pressing action of the glazing pane against the woven or knitted fabric. The amount of this counter-bending is dependent upon the type and the elasticity of the woven or knitted fabric, upon the tension in the woven or knitted fabric, upon the value of the suction or application pressure and upon the size and form of the area, within which the woven or knitted fabric is freely tensioned.

In a further embodiment of the invention, the tension in the woven or knitted fabric is adjustable, so that by increasing or reducing the tension the magnitude of the counter-bending can be modified in a simple manner.

Accordingly, the present invention relates to a holding device for a glazing pane heated in a horizontal position to a deformation temperature comprising a downwardly facing contact surface against which the glazing pane is held by a differential pressure acting between a lower surface and an upper face of the glazing panes. The contact surface of the holding device being formed of a woven or knitted fabric having highly-resistant fibers. The fabric being freely tensioned at least in a middle region of an area intended for bearing against the glazing pane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a second embodiment of a holding device according to the invention as seen from below;

FIG. 4 shows a section on the plane IV—IV of FIG. 3; and

DESCRIPTION OF THE PREFERRED EMBODIMENTS

Figure 1:
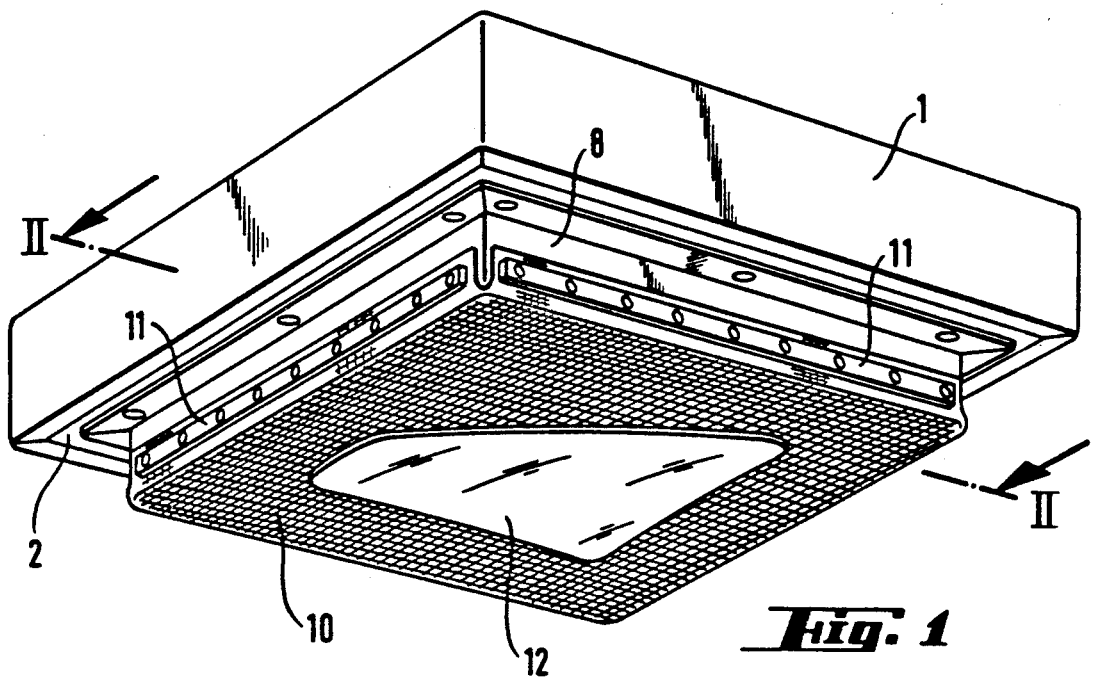
FIG. 1 shows a first embodiment of a holding device according to the invention as seen from below.
Figure 2:
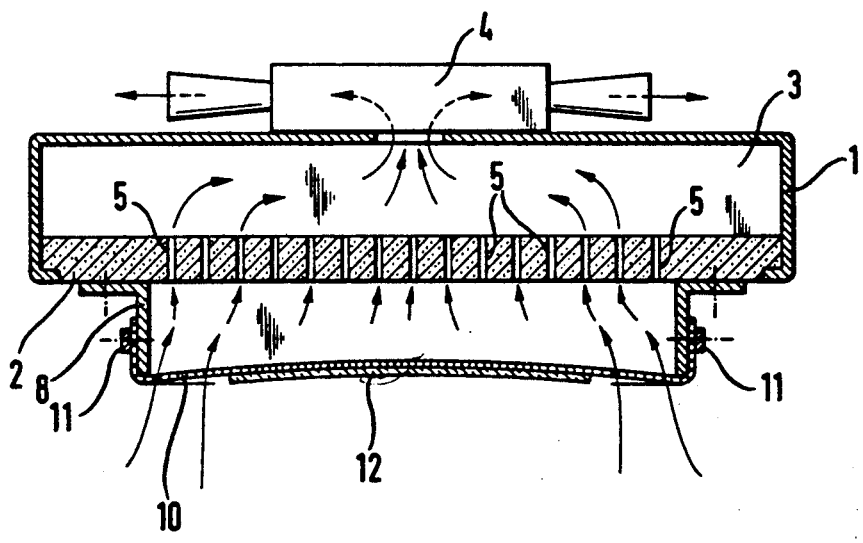
FIG. 2 shows a section on the plane II—II of FIG. 1.

Referring now to the drawings, wherein like reference numerals designate identical or corresponding parts throughout the several views and more particularly to FIGS. 1 and 2, the holding device comprises a metal casing 1 having a bottom plate 2. The chamber 3 inside the metal casing 1 can be subjected to partial vacuum by means of a suction blower 4, mounted on the metal casing 1. The bottom plate 2 comprises a series of through-bores 5, through which the surrounding air can be drawn in by means of the suction blower 4. The casing 1 is disposed on a suitable mounting, by which the holding device can be moved by means of a conventional drive mechanism in a vertical and possibly also horizontal direction. This mounting and drive mechanism for the holding device are not shown for reasons of clarity.

The bottom plate 2 is, in the illustrated case, constructed as a ceramic plate. In this case, usual and already existing holding devices can be used and amplified by the additional equipment. The bottom plate may, however, instead be of metal, especially of heat-resistant steel. It is possible that the holding device may not require a continuous bottom plate, but instead the chamber 3 would be closed on the lower face of the holding device only by a tensioned fabric.

On the lower face of the bottom plate 2, a frame 8 composed of L-sections is fixed. Over this frame 8, a metal fiber fabric 10 is tensioned and is secured by means of metal strips 11 to the frame 8. The size of the frame 8 and fabric 10 are so designed in the case shown here that the dimensional area of the fabric 10 in all directions are larger than the glazing panes 12 to be held by means of this holding device, so that the glazing panes 12 can bear with their entire surface area against the generally resilient fabric.

The fabric 10 comprises a thread system of heat-resistant steel fibers. In one fabric which has proved suitable for this purpose, the threads of the two thread systems each comprise, for example, two to four individual threads twisted together, and each individual thread, in turn, comprises 60 to 120 elementary fibers, twisted together. Each elementary fiber has a diameter of 5 to 20 $\mu$m. The fabric has a threads density of 2 to 10 threads per centimeter. The fabric is sufficiently air permeable, so that the required suction effect is achieved. Under the action of the external excess pressure, the glazing pane 12 is bent uniformly over its entire area by the amount by which the fabric 10 deflects under the action of the external excess pressure.

Another embodiment of the holding device is illustrated in FIGS. 3 and 4. This device has the same construction as the holding device previously described, in so far as the metal casing 1, bottom plate 2, chamber 3 and suction blower 4 are concerned. Underneath the bottom plate 2, a mold frame 16 is attached to the bottom plate 2 by a frame-shaped spacer plate 15, the shape of this mold frame 16 corresponding to the peripheral shape of the glazing panes to be lifted. With this arrangement, the lower surface of the mold frame 16, which has a width of a few centimeters, is slightly inclined upwardly towards the middle of the frame, and the angle $\alpha$ thus formed between the frame surface and the horizontal is approximately equal to the angle which the fabric 17 makes with the horizontal in this region, under the predetermined fabric tension with the sucked-on glazing pane, with the desired bending deflection.

The fabric 17 is composed of the same elementary fibers and threads described in the preceding example. The fabric is, once again, fixed to the spacer frame 15 by means of strips 18. In the spacer frame 15, a series of holes 19 is formed. When the glazing pane to be raised bears closely against the fabric 17 and, through the fabric 17, against the frame 16, the hot surrounding air is sucked through these holes 19 by the blower 4. In this way the vacuum in the chamber 20 above the fabric 17 is prevented from reaching too high values, which would lead to excessive prior bending of the glazing pane. In this case also, of course, the desired amount of prebending of the glazing panes can be adjusted within wide limits by the tension in the fabric 17, the output of the suction blower 4 and the size of the holes 19.

Figure 5:
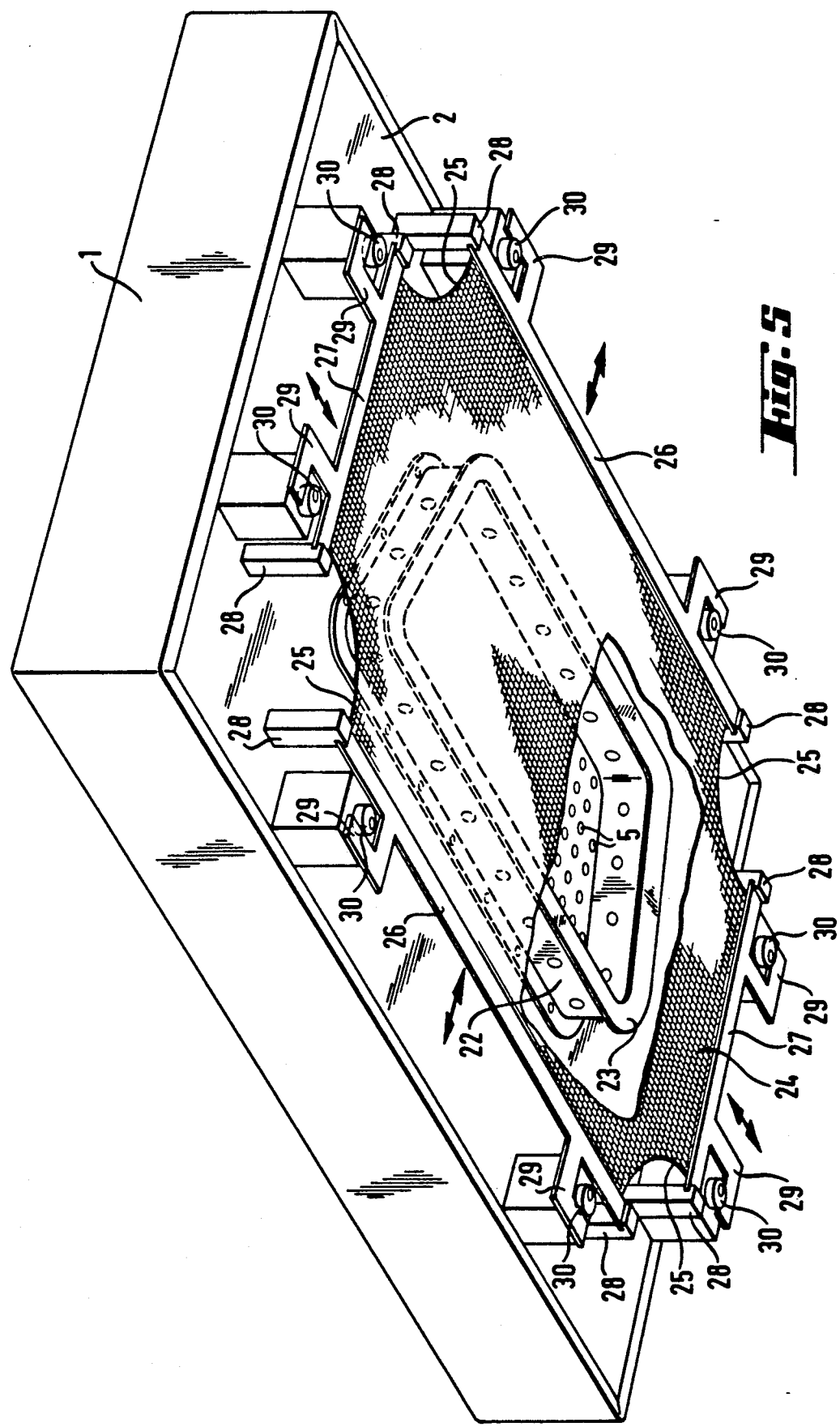
FIG. 5 shows an embodiment having adjustable tensioning of the fabric.

FIG. 5 shows an embodiment of a holding device having an additional tensioning device for the metal fiber fabric. As in the case of the above-described holding device, this embodiment also comprises a metal casing 1, a bottom plate 2 and a mold frame 23 mounted underneath the bottom plate 2 by a spacer frame 22, the mold frame 23 corresponding to the peripheral shape of the glazing panes to be raised and held. Underneath the mold frame 23, the metal fiber fabric 24 is tensioned in contact with it. The fabric 24, which is constructed in the form of a rectangular piece having cut-outs 25 at its four corners, is secured along each two mutually opposite sides by metal strips 26 and 27 respectively. Each metal strip 26 and 27 is mounted and displaceable in a direction transversely to the length of the metal strip, at each of its ends in mountings 28, which are fixed to the bottom plate 2. On each metal strip 26 and 27, two hooks 29 are disposed on the side remote from the fabric 24. These hooks 29 engage behind eccentrically journalled, rotatable cylinders 30, the axes of rotation of which are fixed to the bottom plate 2. By rotating the eccentrics 30, the desired tension in the metal fiber fabric can be adjusted. In the example of the embodiment shown here, the fabric sheet is fixed along all four sides to a metal bar adjustable in this manner. It will be understood, however, that it is also possible to mount the fabric sheet fixed, for example, along two adjacent sides and to provide displaceable holding strips of the type shown only on the other two sides.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing a counter-bend in a glazing pane comprising the steps of:
    mounting a woven or knitted fabric over a frame having a larger dimensional area than the glazing pane so as to tension said fabric over the frame, said frame being positioned on a bottom plate of a casing; and
    applying a vacuum within an area defined by said casing so as to create a differential pressure between a lower surface and an upper surface of the glazing pane for raising the glazing pane against a downwardly facing contact surface of said fabric and deflecting said fabric to produce said counter bend of the glazing pane, wherein the counter-bend of said glazing pane is proportional to the amount of deflection of said fabric.

2. The method according to claim 1, comprising the further step of:
    selectively modifying the tension of said fabric over the frame so as to adjust the amount of counter-bend of said glazing pane.

3. A holding device for a glazing pane heated in a horizontal position to a deformation temperature, comprising:
    a metal casing having a bottom plate, said bottom plate comprising a plurality of through-bores;
    a frame mounted on a lower face of said bottom plate, said frame defining an opening of a dimensional area equal to or larger than the glazing panes to be raised and held;
    a woven or knitted fabric mounted over said frame;
    mounting means for mounting said fabric to said bottom plate such that the fabric covers the opening defined by said frame; and
    blower means on said metal casing for creating a partial vacuum within an area defined by said metal casing and frame;
    wherein:
    said fabric defines a downwardly facing contact surface against which the glazing pane is held by a differential pressure created by said blower means which acts between a lower surface and an upper surface of the glazing pane; and
    said mounting means comprises adjustable tensioning means for selectively adjusting the tension of said fabric.

4. The holding device according to claim 3, wherein said adjustable tensioning means comprises:
    at least one holding strip for clamping one edge of the fabric;
    strip hooks disposed on an outer edge of said at least one holding strip; and
    eccentrically journalled rotatable cylindrical blocks attached to the bottom plate;
    wherein:
    said strip hooks comprise means for engaging the rotatable cylindrical blocks; and
    the rotation of said cylindrical blocks modify the tension of said fabric by displacing said at least one holding strip in a direction which is traverse to the length of the at least one holding strip.

5. The holding device according to claim 3, wherein the fabric comprises fibers of highly heat-resistant steel.

6. The holding device according to claim 3, further comprising a spacing frame for fastening an edge of said mold frame to the bottom plate of said metal casing.

7. The holding device according to claim 6, wherein the spacer frame comprises apertures for permitting suction of outside air through said apertures when said blower means is turned on.

* * * * *